United States Patent
Luo et al.

(10) Patent No.: US 9,515,699 B2
(45) Date of Patent: Dec. 6, 2016

(54) DUAL MODE SERIAL TRANSMISSION APPARATUS AND METHOD FOR SWITCHING MODE THEREOF

(71) Applicant: Novatek Microelectronics Corp., Hsinchu (TW)

(72) Inventors: Ren-Hong Luo, Hsinchu (TW); Yan-Ting Wang, Chiayi (TW); Hsiang-Chi Li, Hsinchu (TW); Mu-Jung Chen, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 14/723,449

(22) Filed: May 27, 2015

(65) Prior Publication Data

US 2016/0226557 A1 Aug. 4, 2016

(30) Foreign Application Priority Data

Jan. 29, 2015 (TW) .............................. 104103011 A

(51) Int. Cl.
| | | |
|---|---|---|
| H04L 27/00 | (2006.01) | |
| H04B 3/32 | (2006.01) | |
| H04B 3/21 | (2006.01) | |
| H04B 3/23 | (2006.01) | |

(52) U.S. Cl.
CPC ........ *H04B 3/32* (2013.01); *H04B 3/21* (2013.01); *H04B 3/23* (2013.01)

(58) Field of Classification Search
CPC .............. H03K 19/018528; H04L 25/0272
USPC ....................................................... 375/257
See application file for complete search history.

(56) References Cited

U.S. PATENT DOCUMENTS

| | | | |
|---|---|---|---|
| 6,977,534 B2 | 12/2005 | Radelinow | |
| 7,598,779 B1* | 10/2009 | Wang | H03K 19/018528 327/108 |
| 2009/0154591 A1 | 6/2009 | Wong et al. | |
| 2009/0174439 A1* | 7/2009 | Luo | H03K 19/018528 327/108 |

OTHER PUBLICATIONS

Postman et al., "SWIFT: A Low-Power Network-On-Chip Implementing the Token Flow Control Router Architecture With Swing-Reduced Interconnects," IEEE Transactions on Very Large Scale Integration (VLSI) Systems, Aug. 2013, pp. 1432-1446.

(Continued)

*Primary Examiner* — David S Huang
(74) *Attorney, Agent, or Firm* — Jianq Chyun IP Office

(57) ABSTRACT

A dual mode serial transmission apparatus and method for switching a mode thereof are provided. The dual mode serial transmission apparatus includes a first and second current sources, a first and second inverting circuits, a differential pair and a resistor string. The first inverting circuit receives a mode selecting signal or a first data transmission signal, the second inverting circuit receives the mode selecting signal or a second data transmission signal. First and second load terminals of the differential pair are respectively coupled to the first and second inverting circuits. A common terminal of the differential pair is coupled to the second current source. First and second differential input terminals receive the mode selecting signal or respectively receive the first and second data transmission signals. The resistor string is coupled in series between output terminals of the first and second inverting circuits.

14 Claims, 6 Drawing Sheets

(56) References Cited

OTHER PUBLICATIONS

Krishna et al., "SWIFT: A SWing-reduced Interconnect for a Token-based Network-on-Chip in 90nm CMOS," 2010 IEEE International Conference on Computer Design (ICCD), Oct. 2010, pp. 439-446.

Grange et al., "Optimal Signaling Techniques for Through Silicon Vias in 3-D Integrated Circuit Packages," 19th Topical Meeting on Electrical Performance of Electronic Packaging and Systems, Oct. 2010, pp. 237-240.

Zheng et al., "An Efficient 90nm Technology-Node GHz Transceiver of On-Chip Global Interconnect," 2011 IEEE 9th International Conference on ASIC (ASICON), Oct. 2011, pp. 649-652.

Postman et al., "Energy-Efficient Transceiver Circuits for Short-Range On-chip Interconnects," 2011 IEEE Custom Integrated Circuits Conference (CICC), Sep. 2011, pp. 1-4.

Gomi et al., "High Speed and Low Power Global Interconnect IP with Differential Transmission Line and Driver-Receiver Circuits," Aug. 2004, pp. 384-387.

"Office Action of Taiwan Counterpart Application", issued on Apr. 25, 2016, p. 1-p. 4.

* cited by examiner

DUAL MODE SERIAL TRANSMISSION APPARATUS AND METHOD FOR SWITCHING MODE THEREOF

CROSS-REFERENCE TO RELATED APPLICATION

This application claims the priority benefit of Taiwan application serial no. 104103011, filed on Jan. 29, 2015. The entirety of the above-mentioned patent application is hereby incorporated by reference herein and made a part of this specification.

BACKGROUND

Technical Field

The invention relates to a dual mode serial transmission apparatus and a method for switching mode thereof.

Related Art

In a serial transmission system constructed through a complementary metal oxide semiconductor (CMOS) manufacturing process, a commonly used mode of a transmitting end includes a low voltage differential signal transmission mode (LVDS) and a current mode logic (CML). Referring to FIG. 1A and FIG. 1B, FIG. 1A and FIG. 1B are circuit diagrams of a LVDS mode serial transmission apparatus and a CML mode serial transmission apparatus. In FIG. 1A, the LVDS mode serial transmission apparatus 110 is composed of current sources IS1, IS2, switches S1-S4 and a resistor R1. In FIG. 1B, the CML mode serial transmission apparatus 120 is composed of switches S5, S6, a current source IS3 and resistors R2 and R3, and the CML mode serial transmission apparatus 120 provides paths for pulling up to an operating power VCC. The serial transmission apparatuses 110 and 120 generate complementary output signals OUTP and OUTN through switching operations of the switches thereof.

Regardless of the LVDS mode or the CML mode serial transmission apparatus, due to non-ideal of control signals used for controlling the switches S1-S6, a period of a temporary transition state when the switches S1-S7 being switched between logic 1 and logic 0 in response to the control signals, and the temporary transition state is generally a main reason for producing a common mode noise, such that the whole system is interfered by electromagnetic interference.

SUMMARY

The invention is directed to a dual mode serial transmission apparatus, which satisfies data transmission operations of two operation modes.

The invention provides a dual mode serial transmission apparatus including a first current source, a first inverting circuit, a second inverting circuit, a second current source, and a differential pair. The first and second inverting circuits are coupled to the first current source. The first inverting circuit receives a mode selecting signal or a first data transmission signal, the second inverting circuit receives the mode selecting signal or a second data transmission signal. A first and second load terminals of the differential pair are respectively coupled to the first inverting circuit and the second inverting circuit. A common terminal of the differential pair is coupled to the second current source. A first and second differential input terminals of the differential pair receive the mode selecting signal or respectively receive the first and second data transmission signals.

In an embodiment of the invention, the dual mode serial transmission apparatus further includes a resistor string. The resistor string has a first resistor and a second resistor, and the first and second resistors are coupled in series between an output terminal of the first inverting circuit and an output terminal of the second inverting circuit.

In an embodiment of the invention, under a first operation mode, the first and second inverting circuits respectively receive the first and second data transmission signals, and the first and second differential input terminals of the differential pair respectively receive the mode selecting signal. Under a second operation mode, the first and second inverting circuits receive the mode selecting signal, and the first and second differential input terminals of the differential pair respectively receive the first and second data transmission signals.

In an embodiment of the invention, the first operation mode is a low voltage differential signal transmission mode, and the second operation mode is a current mode logic.

The invention provides a method for switching mode, which is adapted to the aforementioned dual mode serial transmission apparatus, and the method includes following steps. Under a first operation mode, the mode selecting single is provided to the differential pair, such as that the differential pair conducts a connection path between the first inverting circuit and the common terminal, and conducts a connection path between the second inverting circuit and the common terminal. Under a second operation mode, the mode selecting signal is provided to the first and second inverting circuits, so as to conduct a connection path between the first load terminal and the output terminal of the first inverting circuit, and conduct a connection path between the second load terminal and the output terminal of the second inverting circuit.

According to the above descriptions, in the dual mode serial transmission apparatus of the invention, in response to the mode selecting signal, the dual mode serial transmission apparatus can select to operate under different operation modes. In this way, under the premise of satisfying data transmission demands of multiple operation modes, an area of a hardware circuit is effectively decreased, and circuit function and production cost balanced, such that product competitiveness is effectively enhanced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
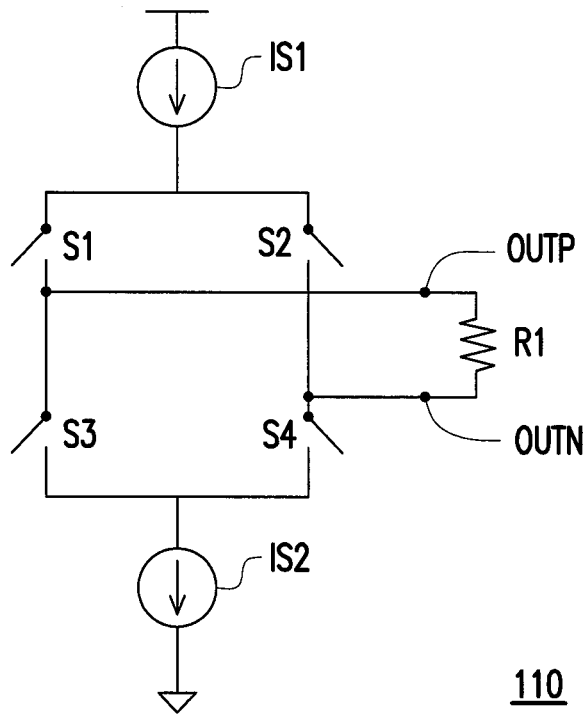
FIG. 1A and FIG. 1B are circuit diagrams of a low voltage differential signal (LVDS) mode serial transmission apparatus and a current mode logic (CML) mode serial transmission apparatus.
Figure 1B:
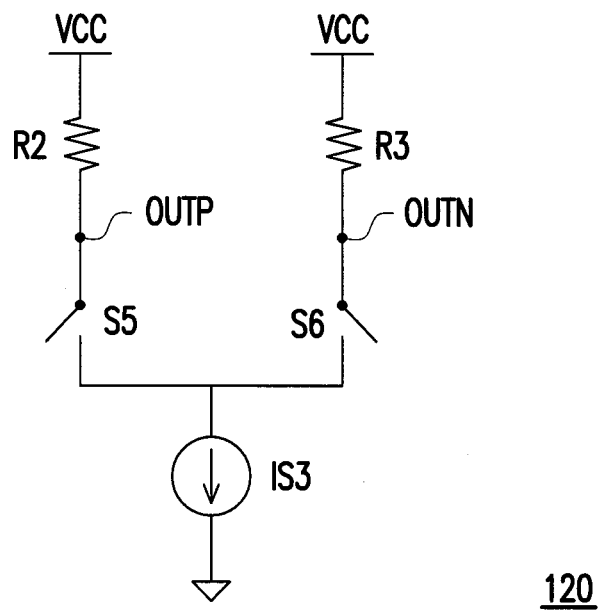
Figure 2:
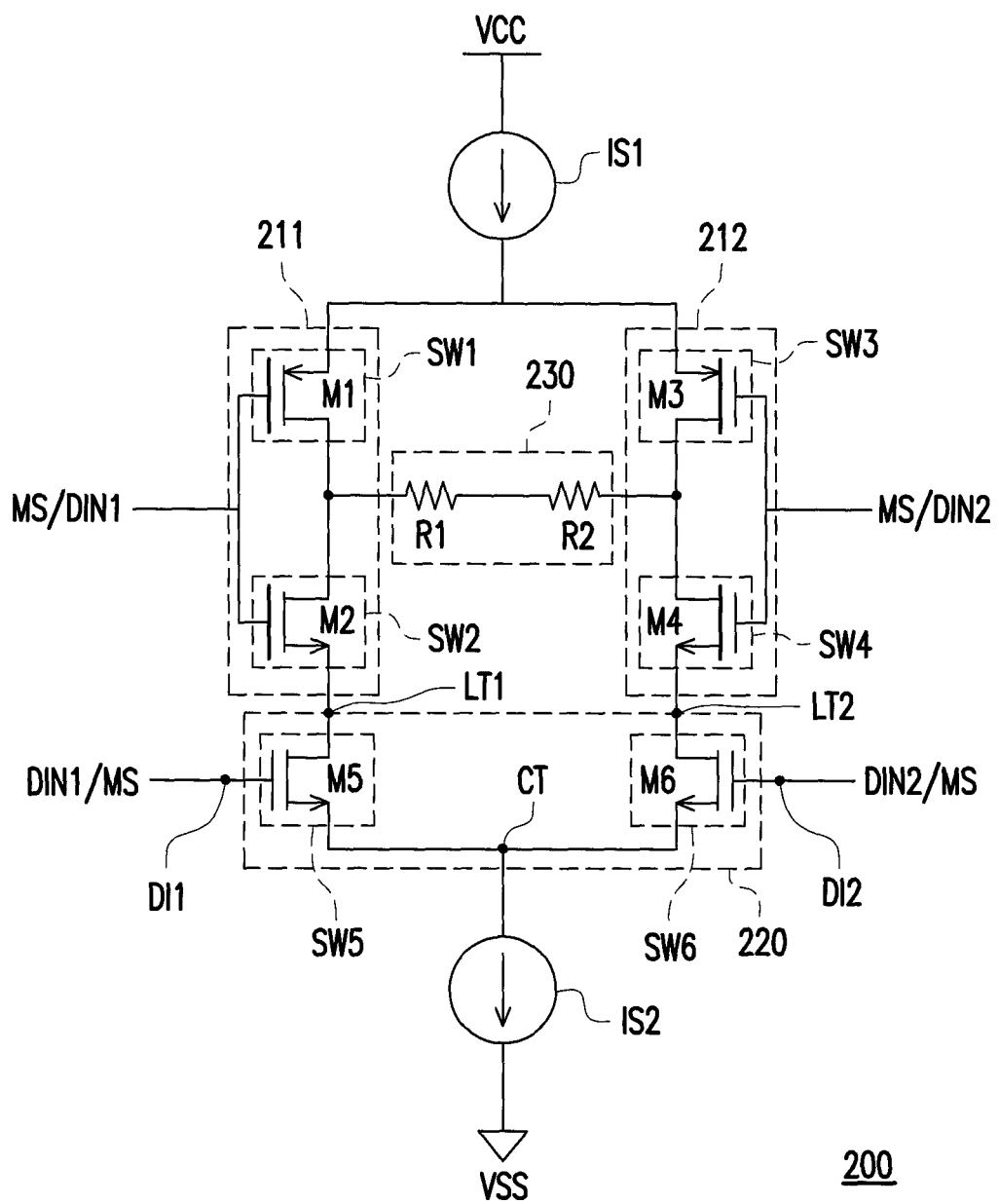
FIG. 2 is a schematic diagram of a dual mode serial transmission apparatus according to an embodiment of the invention.

Referring to FIG. 2, FIG. 2 is a schematic diagram of a dual mode serial transmission apparatus according to an embodiment of the invention. The dual mode serial transmission apparatus 200 includes current sources IS1 and IS2, inverting circuits 211 and 212, a differential pair 220 and a resistor string 230. The current source IS1 is coupled between an operating power VCC and the inverting circuits 211 and 212, and the current source IS1 provides a current to flow to the inverting circuits 211 and 212. The inverting circuit 211 is coupled between the current source IS1 and a load terminal LT1 of the differential pair 220, and the inverting circuit 211 receives a mode selecting signal MS or a first data transmission signal DIN1. Moreover, the inverting circuit 212 is coupled between the current source IS1 and a load terminal LT2 of the differential pair 220, and the inverting circuit 212 receives the mode selecting signal MS or a second data transmission signal DIN2.

The differential pair 220 is coupled between the current source IS2 and the inverting circuits 211 and 212. A differential input terminal DI1 of the differential pair 220 receives the first data transmission signal DIN1 or the mode selecting signal MS, a differential input terminal DI2 of the differential pair 220 receives the second data transmission signal DIN2 or the mode selecting signal MS, and a common terminal CT of the differential pair 220 is coupled to the current source IS2. The current source IS2 is coupled in series between the common terminal CT of the differential pair 220 and a reference ground terminal VSS, where a current provided by the current source IS2 flows from the common terminal CT to the reference ground terminal VSS.

The resistor string 230 is coupled in series between output terminals of the inverting circuits 211 and 212. In the present embodiment, the resistor string 230 includes a resistor R1 and a resistor R2 which are coupled in series.

Regarding an operation detail of the dual mode serial transmission apparatus 200, a situation that the inverting circuits 211 and 212 and the differential pair 220 receiving the mode selecting signal MS or the first and second data transmission signals DIN1 and DIN2 is determined by operation modes of the dual mode serial transmission apparatus 200. To be specific, when the dual mode serial transmission apparatus 200 is under a first operation mode, the inverting circuits 211 and 212 receive the first and the second data transmission signals DIN1 and DIN2, and the differential pair 220 receives the mode selecting signal MS. Comparatively, when the dual mode serial transmission apparatus 200 is under a second operation mode, the inverting circuits 211 and 212 receive the mode selecting signal MS, and the differential pair 220 receives the first and the second data transmission signals DIN1 and DIN2. The first and second data transmission signals DIN1 and DIN2 may be complementary signals.

It should be noted that the first operation mode may be a low voltage differential signal transmission mode (LVDS), and the second operation mode may be a current mode logic (CML).

In detail, the inverting circuit 211 includes switches SW1 and SW2. One terminal of the switch SW1 is coupled to the current source IS1, and another terminal of the switch SW1 is coupled to the resistor string 230. One terminal of the switch SW2 is coupled to a common coupling terminal of the resistor string 230 and the switch SW1, and another terminal of the switch SW2 is coupled to the load terminal LT1 of the differential pair 220. Under the first operation mode, the switches SW1 and SW2 commonly receive the first data transmission signal DIN1, and under the second operation mode, the switches SW1 and SW2 commonly receive the mode selecting signal MS.

The inverting circuit 212 includes switches SW3 and SW4. One terminal of the switch SW3 is coupled to the current source IS1, and another terminal of the switch SW3 is coupled to the resistor string 230. One terminal of the switch SW4 is coupled to a common coupling terminal of the resistor string 230 and the switch SW3, and another terminal of the switch SW4 is coupled to the load terminal LT2 of the differential pair 220. Under the first operation mode, the switches SW3 and SW4 commonly receive the second data transmission signal DIN2, and under the second operation mode, the switches SW3 and SW4 commonly receive the mode selecting signal MS.

Moreover, the switches SW1-SW4 are respectively transistor switches and may be implemented by transistors M1-M4, respectively. The transistors M1 and M3 are P-type transistors, and the transistors M2 and M4 are N-type transistors. Namely, turning-on or turning-off states of the switches SW1 and SW2 are complementary, and turning-on or cutting-off states of the switches SW3 and SW4 are complementary.

The differential pair 220 includes a switch SW5 and a switch SW6. One terminal of the switch SW5 is coupled to the load terminal LT1 of the differential pair 220, and another terminal of the switch SW5 is coupled to the current source IS2. One terminal of the switch SW6 is coupled to the load terminal LT2 of the differential pair 220, and another terminal of the switch SW6 is coupled to the current source IS2.

The switches SW5-SW6 may be respectively implemented by a transistor M5 and a transistor M6. In the present embodiment, the transistor M5 and the transistor M6 may be N-type transistors.

It should be noted that when the dual mode serial transmission apparatus 200 is operated under the second operation mode, and a coupling node of the resistor R1 and the resistor R2 may be connected to the operating power VCC.

Figure 3:
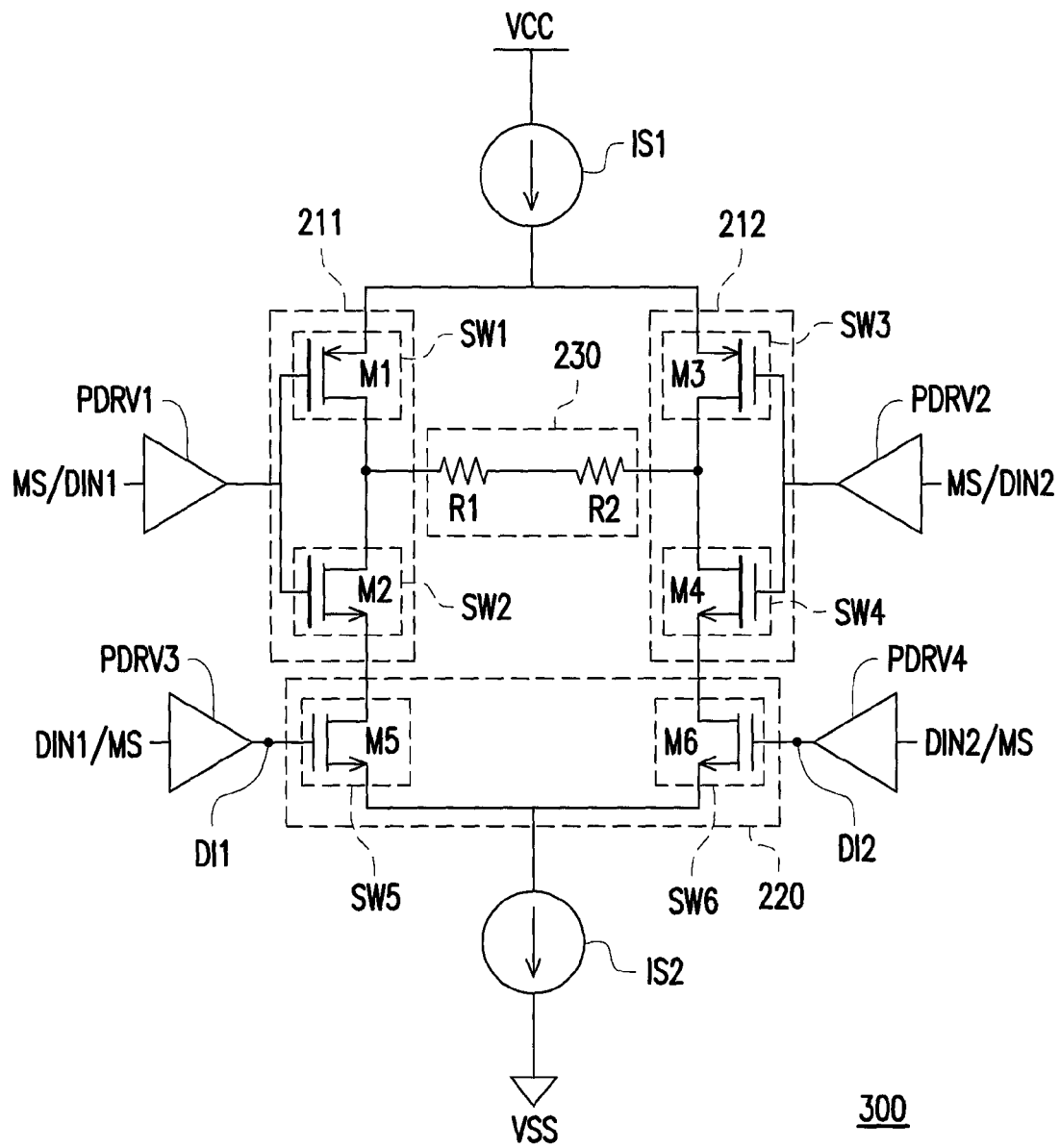
FIG. 3 is a schematic diagram of a dual mode serial transmission apparatus according to another embodiment of the invention.

Referring to FIG. 3, FIG. 3 is a schematic diagram of a dual mode serial transmission apparatus according to another embodiment of the invention. The dual mode serial transmission apparatus 300 includes the dual mode serial transmission apparatus 200 and pre-drivers PDRV1-PDRV4. The pre-drivers PDRV1 and PDRV2 are respectively coupled to the inverting circuits 211 and 212, and the pre-drivers PDRV3 and PDRV4 are respectively coupled to the differential input terminals DI1 and DI2 of the differential pair 220. In detail, the pre-drive PDRV1 is coupled in series on a path which the inverting circuit 211 receives the mode selecting signal MS or the first data transmission signal DIN1, the pre-drive PDRV2 is coupled in series on a path which the inverting circuit 212 receives the mode selecting signal MS or the second data transmission signal DIN2, the pre-drive PDRV3 is coupled in series on a path which the differential input terminal DI1 of the differential pair 220 receives the mode selecting signal MS or the first data transmission signal DIN1, and the pre-drive PDRV4 is coupled in series on a path which the differential input terminal DI2 of the differential pair 220 receives the mode selecting signal MS or the second data transmission signal DIN2.

The pre-drivers PDRV1-PDRV4 can serve as buffers to adjust a driving capability of the received signals, and transmit the buffered signals to the inverting circuits 211 and 212 and the differential input terminals DI1 and DI2 of the differential pair 220. In the present embodiment, the pre-drivers PDRV1-PDRV4 can also adjust a transition point of the received signal. Details related to adjustment of the transition point performed by the pre-drivers PDRV1-PDRV4 are described later in the following embodiment.

Figure 4A:
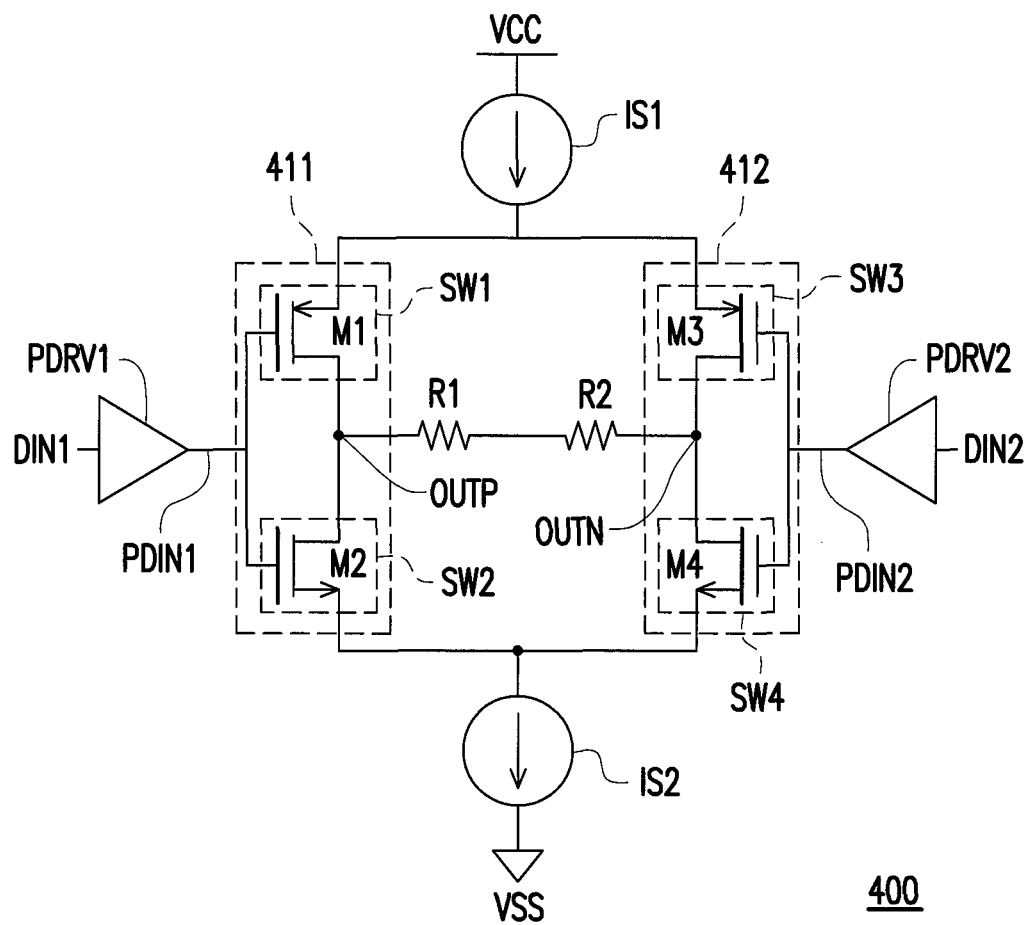
FIG. 4A is an equivalent circuit schematic diagram of a dual mode serial transmission apparatus 300 under a first operation mode according to an embodiment of the invention.

Referring to FIG. 4A, FIG. 4A is an equivalent circuit schematic diagram of the dual mode serial transmission apparatus 300 under the first operation mode according to an embodiment of the invention. Under the first operation mode (the LVDS mode), the transistors M5 and M6 in the dual mode serial transmission apparatus 300 receive the mode selecting signal MS with a logic high level through gates thereof, and are accordingly turned on, and the current source IS2 is regarded to be directly connected to the transistors M2 and M4.

Moreover, under the first operation mode, the pre-drivers PDRV1 and PDRV2 respectively receive the first and second data transmission signals DIN1 and DIN2, the pre-driver PDRV1 transmits a generated output signal to control terminals of the switches SW1 and SW2, and the pre-driver PDRV2 transmits a generated output signal to control terminals of the switches SW3 and SW4. The turning-on or cutting-off operations of the switches SW1 and SW2 are complementary, the turning-on or cutting-off operations of the switches SW3 and SW4 are complementary, and the turning-on or cutting-off operations of the switches SW1 and SW3 are complementary. In this way, the equivalent circuit 400 can generate the complementary output signals OUTP and OUTN to implement data transmission according to switching operations of the switches SW1-SW4 controlled by the first and second data transmission signals DIN1 and DIN2.

Further, when the switches SW1 and SW4 are turned on (the switches SW2 and SW3 are cut off), the output signal OUTP are pulled high in response to the current source IS1, and the output signal OUTN is pulled low in response to the current source IS2. Comparatively, when the switches SW1 and SW4 are cut off (the switches SW2 and SW3 are turned on), the output signal OUTN are pulled high in response to the current source IS1, and the output signal OUTP is pulled low in response to the current source IS2.

Figure 4B:
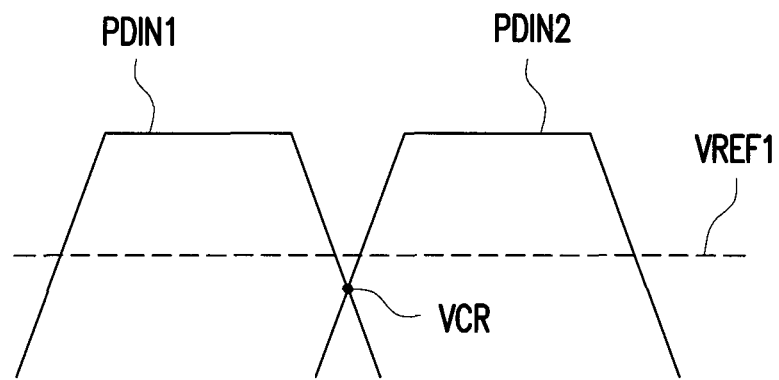
FIG. 4B is a waveform diagram of an adjusted first data transmission signal PDIN1 and an adjusted second data transmission signal PDIN2.

It should be noted that under the transmission mode of the first operation mode (LVDS), the pre-drivers PDRV1 and PDRV2 can respectively adjust transition points of the first data transmission signal DIN1 and the second data transmission signal DIN2 to generate an adjusted first data transmission signal PDIN1 and an adjusted second data transmission signal PDIN2. Referring to FIG. 4B, FIG. 4B is a waveform diagram of the adjusted first data transmission signal PDIN1 and the adjusted second data transmission signal PDIN2. An intersection voltage VCR of the adjusted first data transmission signal PDIN1 and the adjusted second data transmission signal PDIN2 is decreased, and the intersection voltage VCR can be decreased to be lower than a predetermined voltage value VREF1. Here, in case that an electrical specification of a common mode voltage ((output signal OUTP+output signal OUTN)/2) is ⅓ or ¼ of the operating power VCC, the predetermined voltage value VREF1 can be a half or even lower compared with the voltage value of the operating power VCC. In case that the intersected voltage of the adjusted first data transmission signal PDIN1 and the adjusted second data transmission signal PDIN2 is decreased, a common mode noise at the output terminal of the dual mode serial transmission apparatus 300 can be avoided (i.e. the switches SW1 and SW3 are cut off, the switches SW2 and SW4 are turned on, and the common mode voltage is pulled down) during a polarity conversion process of the adjusted first data transmission signal PDIN1 and the adjusted second data transmission signal PDIN2, and therefore electromagnetic interference produced due to switching of the switches SW1-SW4 is decreased to the minimum for improving a signal transmission performance.

Figure 5A:
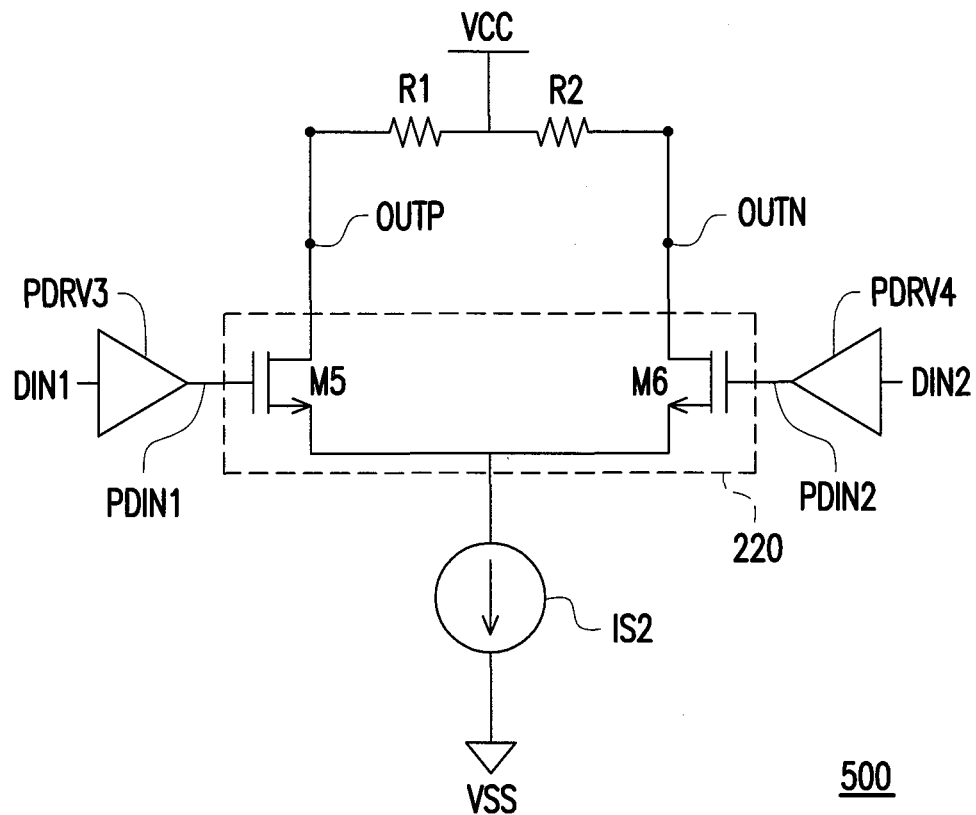
FIG. 5A is an equivalent circuit schematic diagram of a dual mode serial transmission apparatus 300 under a second operation mode according to an embodiment of the invention.

Referring to FIG. 5A, FIG. 5A is an equivalent circuit schematic diagram of the dual mode serial transmission apparatus 300 under the second operation mode according to an embodiment of the invention. Under the second operation mode (the CML mode), the transistors M1 and M3 in the dual mode serial transmission apparatus 300 receive the mode selecting signal MS with the logic high level through gates thereof, and are accordingly cut off, and the transistors M2 and M4 receive the mode selecting signal MS with the logic high level through gates thereof, and are accordingly turned on. In this case, the current source IS1 is regarded to be directly connected to the transistors M5 and M6.

The equivalent circuit 500 is an equivalent circuit of the dual serial transmission apparatus 300 under the second operation mode. The pre-drivers PDRV3 and PDRV4 respectively receive the first and the second data transmission signals DIN1 and DIN2 and produce the adjusted data transmission signals PDIN1 and PDIN2. Moreover, a coupling node of the resistors R1 and R2 can be coupled to the operating power VCC under the second operation mode.

The adjusted data transmission signals PDIN1 and PDIN2 are respectively transmitted to the gates of the transistors M5 and M6 for turning on/off the same, and through the complementary adjusted data transmission signals PDIN1 and PDIN2, the equivalent circuit 500 generates the complementary output signals OUTP and OUTN for transmission.

Further, when the transistor M5 is turned on (the transistor M6 is cut off), the output signal OUTP is pulled low according to the current source IS2, and the output signal OUTN is pulled high to the operating power VCC through a pull-up path provided by the resistor R2. Comparatively, when the transistor M6 is turned on (the transistor M5 is cut off), the output signal OUTN is pulled low according to the current source IS2, and the output signal OUTP is pulled high to the operating power VCC through a pull-up path provided by the resistor R1.

Figure 5B:
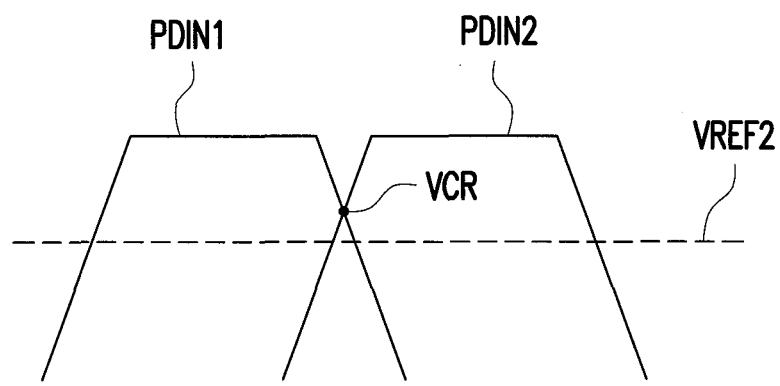
FIG. 5B is a waveform diagram of an adjusted first data transmission signal PDIN1 and an adjusted second data transmission signal PDIN2.

The pre-drivers PDRV3 and PDRV4 respectively adjust transition points of the first and the second data transmission signals DIN1 and DIN2 to generate the adjusted first and second data transmission signals PDIN1 and PDIN2. Referring to FIG. 5B, FIG. 5B is a waveform diagram of the adjusted first data transmission signal PDIN1 and the adjusted second data transmission signal PDIN2. In the present embodiment, the pre-drivers PDRV3 and PDRV4 make an intersection voltage VCR generated during transition of the adjusted first data transmission signal PDIN1 and the adjusted second data transmission signal PDIN2 to be higher than a predetermined voltage value VREF2. Here, the predetermined voltage value VREF2 can be a half or more than a half of the voltage value of the operating power VCC. In case that the intersection voltage VCR of the adjusted first data transmission signal PDIN1 and the adjusted second data transmission signal PDIN2 is increased, a situation that the transistors M5 and M6 are simultaneously cut off can be effectively avoided (now the output signals OUTP and OUTN are respectively pulled up to a high level by the resistors R1 and R2, i.e. to produce a rising common mode voltage), and therefore electromagnetic interference produced due to switching of the transistors M5 and M6 is decreased to the minimum, so as to improve a signal transmission performance.

Figure 6:
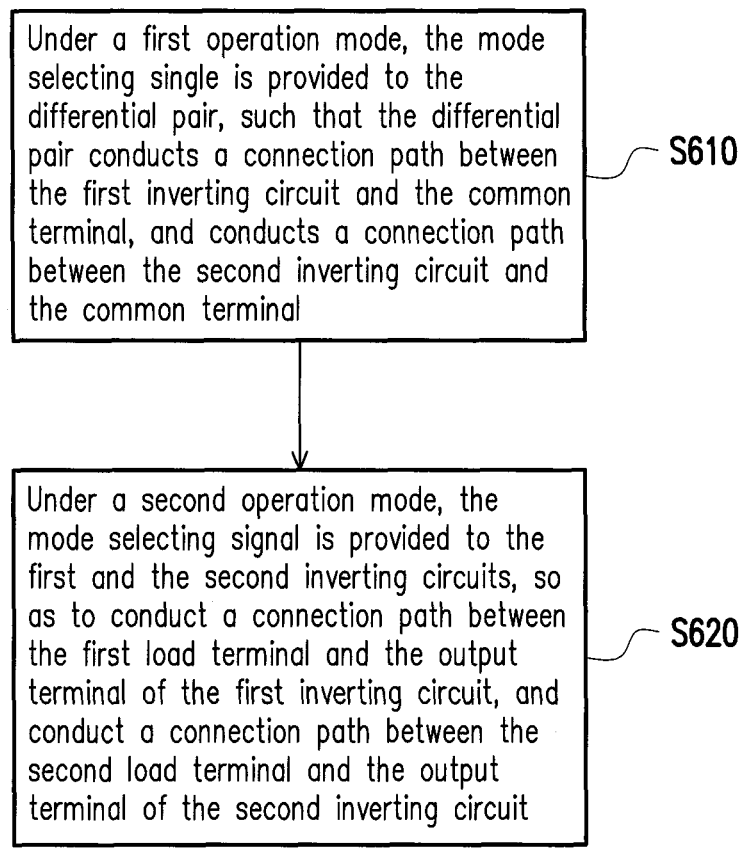
FIG. 6 is a flowchart illustrating a method for switching mode of a dual mode serial transmission apparatus according to an embodiment of the invention.

Referring to FIG. 6, FIG. 6 is a flowchart illustrating a method for switching mode of a dual mode serial transmission apparatus according to an embodiment of the invention. The method shown in FIG. 6 is adapted to the dual mode serial transmission apparatuses 200 and 300 shown in FIG. 2 and FIG. 3. In step S610, under the first operation mode, the mode selecting single is provided to the differential pair, such that the differential pair conducts a connection path between the first inverting circuit and the common terminal, and conducts a connection path between the second inverting circuit and the common terminal. In step S620, under the second operation mode, the mode selecting signal is provided to the first and second inverting circuits, so as to conduct a connection path between the first load terminal and the output terminal of the first inverting circuit, and conduct a connection path between the second load terminal and the output terminal of the second inverting circuit.

Implementation details of the above steps have been described in the aforementioned embodiment, so that detail thereof is not repeated.

In summary, the serial transmission apparatus is integrated to construct the dual mode serial transmission apparatus, and the dual mode serial transmission apparatus can be respectively operated under the first and the second operation modes through the mode selecting signal. In this way, through a simple signal selection, the dual mode serial transmission apparatus can be operated under different modes, so as to improve a usage range thereof. It should be noticed that in an embodiment of the invention, by adjusting transition points of the data transmission signals, the electromagnetic interference generated due to switching of the switches in the dual mode serial transmission apparatus can be effectively decreased, so as to improve the signal transmission quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A dual mode serial transmission apparatus, comprising:
   a first current source;
   a first inverting circuit, coupled to the first current source, and receiving a mode selecting signal or a first data transmission signal;
   a second inverting circuit, coupled to the first current source, and receiving the mode selecting signal or a second data transmission signal;
   a second current source; and
   a differential pair, having a first and a second load terminals respectively coupled to the first inverting circuit and the second inverting circuit, a common terminal being coupled to the second current source, and a first and second differential input terminals receiving the mode selecting signal or respectively receiving the first and second data transmission signals,
   wherein when the first and second inverting circuits respectively receive the first and second data transmission signals, the differential pair receives the mode selecting signal, and when the first and second inverting circuits receive the mode selecting signal, the differential pair receives the first and second data transmission signals.

2. The dual mode serial transmission apparatus as claimed in claim 1, comprising:
   a resistor string, having a first resistor and second resistor, wherein the first and the second resistors are coupled in series between an output terminal of the first inverting circuit and an output terminal of the second inverting circuit.

3. The dual mode serial transmission apparatus as claimed in claim 1, wherein under a first operation mode, the first and second inverting circuits respectively receive the first and second data transmission signals, and the first and second differential input terminals of the differential pair receive the mode selecting signal, and under a second operation mode, the first and second inverting circuits receive the mode selecting signal, and the first and second differential input terminals of the differential pair respectively receive the first and second data transmission signals.

4. The dual mode serial transmission apparatus as claimed in claim 3, wherein the first inverting circuit comprises:
   a first switch, coupled in series between the first current source and the resistor string, wherein the first switch is turned on or cut off according to the mode selecting signal or the first data transmission signal; and
   a second switch, coupled in series between the resistor string and the first load terminal, wherein the second switch is turned on or cut off according to the mode selecting signal or the first data transmission signal;
   the second inverting circuit comprises:
   a third switch, coupled in series between the first current source and the resistor string, wherein the third switch is turned on or cut off according to the mode selecting signal or the second data transmission signal; and
   a fourth switch, coupled in series between the resistor string and the second load terminal, wherein the fourth switch is turned on or cut off according to the mode selecting signal or the second data transmission signal.

5. The dual mode serial transmission apparatus as claimed in claim 4, wherein under the second operation mode, the first and third switches are cut off according to the mode selecting signal, and the second and fourth switches are turned on according to the mode selecting signal.

6. The dual mode serial transmission apparatus as claimed in claim 3, wherein the differential pair comprises:
   a fifth switch, coupled between the first load terminal and the common terminal, wherein the fifth switch is turned on or cut off according to the mode selecting signal or the first data transmission signal; and
   a sixth switch, coupled between the second load terminal and the common terminal, wherein the sixth switch is turned on or cut off according to the mode selecting signal or the second data transmission signal.

7. The dual mode serial transmission apparatus as claimed in claim 6, wherein under the first operation mode, the fifth and the sixth switches are cut off according to the mode selecting signal.

8. The dual mode serial transmission apparatus as claimed in claim 3, wherein under the second operation mode, common coupling terminals of the first and the second resistors are applied with an operating power of the dual mode serial transmission apparatus.

9. The dual mode serial transmission apparatus as claimed in claim 3, wherein the first operation mode is a first low voltage differential signal transmission mode, and the second operation mode is a current mode logic.

10. The dual mode serial transmission apparatus as claimed in claim 3, wherein under the first operation mode, an intersection voltage generated when the first and second data transmission signals are transited is lower than a first predetermined voltage value, and under the second operation mode, the intersection voltage is higher than a second predetermined voltage value, and the first predetermined voltage value is smaller than or equal to the second predetermined voltage value.

11. The dual mode serial transmission apparatus as claimed in claim 1, further comprising:
 a first pre-driver, coupled on a path which the first inverting circuit receives the mode selecting signal or the first data transmission signal;
 a second pre-driver, coupled on a path which the second inverting circuit receives the mode selecting signal or the second data transmission signal;
 a third pre-driver, coupled on a path which the first differential input terminal receives the mode selecting signal or the first data transmission signal; and
 a fourth pre-driver, coupled on a path which the second differential input terminal receives the mode selecting signal or the second data transmission signal.

12. A method for switching mode in the dual mode serial transmission apparatus as claimed in claim 1, the method comprising:
 providing the mode selecting signal to the differential pair under a first operation mode, for conducting a connection path between the first inverting circuit and the common terminal by the differential pair, and conducting a connection path between the second inverting circuit and the common terminal by the differential pair;
 providing the mode selecting signal to the first and the second inverting circuits under a second operation mode, for conducting a connection path between the first load terminal and the output terminal of the first inverting circuit, and conducting a connection path between the second load terminal and the output terminal of the second inverting circuit;
 respectively providing the first and the second data transmission signals to the first and the second inverting circuits under the first operating mode; and
 respectively providing the first and the second data transmission signals to the first and the second differential input terminals of the differential pair under the second operation mode.

13. The method for switching mode as claimed in claim 12, wherein the first operation mode is a first low voltage differential signal transmission mode, and the second operation mode is a current mode logic.

14. The method for switching mode as claimed in claim 12, wherein under the first operation mode, an intersection voltage generated when the first and second data transmission signals are transited is lower than a first predetermined voltage value, and under the second operation mode, the intersection voltage is higher than a second predetermined voltage value, and the first predetermined voltage value is smaller than or equal to the second predetermined voltage value.

* * * * *